(12) United States Patent
Hazel et al.

(10) Patent No.: US 7,442,444 B2
(45) Date of Patent: *Oct. 28, 2008

(54) BOND COAT FOR SILICON-CONTAINING SUBSTRATE FOR EBC AND PROCESSES FOR PREPARING SAME

(75) Inventors: Brian Thomas Hazel, West Chester, OH (US); Irene Spitsberg, Loveland, OH (US); Brett Allen Boutwell, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 11/150,098

(22) Filed: Jun. 13, 2005

(65) Prior Publication Data

US 2006/0280953 A1    Dec. 14, 2006

(51) Int. Cl.
*B32B 15/04* (2006.01)
*B32B 18/00* (2006.01)
*F01D 5/14* (2006.01)

(52) U.S. Cl. .................. 428/641; 428/335; 428/446; 428/632; 416/241 R

(58) Field of Classification Search ............. 428/641, 428/446, 450, 632, 633, 335, 334, 220, 215, 428/216; 416/241 R, 241 B, 229 R
See application file for complete search history.

(56) References Cited

U.S. PATENT DOCUMENTS

| | | | |
|---|---|---|---|
| 3,189,477 A * | 6/1965 | Shaffer ............ 428/312.2 |
| 3,415,672 A | 12/1968 | Levinstein et al. |
| 3,540,878 A | 11/1970 | Levine et al. |
| 3,598,638 A | 8/1971 | Levine |
| 3,667,985 A | 6/1972 | Levine et al. |
| 3,993,844 A | 11/1976 | Kiger et al. |
| 4,590,095 A | 5/1986 | Park |
| 4,713,302 A | 12/1987 | Komatsu |
| 4,741,286 A | 5/1988 | Itoh et al. |
| 4,889,776 A * | 12/1989 | Priceman ............ 428/629 |
| 4,921,822 A | 5/1990 | Luthra |

(Continued)

OTHER PUBLICATIONS

U.S. Appl. No. 11/084,104, filed Mar. 21, 2005, Spitsberg et al.

(Continued)

*Primary Examiner*—Michael La Villa
(74) *Attorney, Agent, or Firm*—Marcella R. Louke; William Scott Andes

(57) ABSTRACT

An article comprising a silicon-containing substrate, a silicide-containing bond coat layer overlying the substrate, and typically an environmental barrier coating overlaying the bond coat layer. An article is also provided wherein the environmental barrier coating comprises: (1) an optional inner silica scale layer overlaying the bond coat layer; (2) intermediate layer overlaying the inner silica scale layer, or the bond coat layer in the absence of the inner silica scale layer, and comprising mullite, or a combination of mullite with a barium strontium aluminosilicate, a yttrium silicate, or a calcium aluminosilicate; and (3) an outer steam-resistant barrier layer overlaying the intermediate layer and consisting essentially of an alkaline earth silicate/aluminosilicate. Processes are also provided for forming the silicide-containing bond coat layer over the substrate, followed by forming the environmental barrier coating over the bond coat layer.

24 Claims, 2 Drawing Sheets

U.S. PATENT DOCUMENTS

| | | | |
|---|---|---|---|
| 5,047,612 | A | 9/1991 | Savkar et al. |
| 5,332,598 | A | 7/1994 | Kawasaki et al. |
| 5,645,893 | A | 7/1997 | Rickerby et al. |
| 5,660,885 | A | 8/1997 | Hasz et al. |
| 5,716,720 | A | 2/1998 | Murphy |
| 5,741,596 | A | 4/1998 | Skowronski et al. |
| 5,805,973 | A | 9/1998 | Coffinberry et al. |
| 5,869,146 | A | 2/1999 | McCluskey et al. |
| 5,985,470 | A | 11/1999 | Spitsberg et al. |
| 6,025,078 | A | 2/2000 | Rickerby et al. |
| 6,117,560 | A | 9/2000 | Maloney |
| 6,129,954 | A | 10/2000 | Spitsberg et al. |
| 6,146,696 | A | 11/2000 | Das et al. |
| 6,177,200 | B1 | 1/2001 | Maloney |
| 6,284,323 | B1 | 9/2001 | Maloney |
| 6,284,325 | B1 | 9/2001 | Eaton, Jr. et al. |
| 6,291,014 | B1 | 9/2001 | Warnes et al. |
| 6,296,941 | B1 | 10/2001 | Eaton, Jr. et al. |
| 6,296,942 | B1 | 10/2001 | Eaton, Jr. et al. |
| 6,299,988 | B1 | 10/2001 | Wang et al. |
| 6,312,763 | B1 | 11/2001 | Eaton, Jr. et al. |
| 6,319,614 | B1 | 11/2001 | Beele |
| 6,326,057 | B1 | 12/2001 | Das et al. |
| 6,332,931 | B1 | 12/2001 | Das et al. |
| 6,333,118 | B1 | 12/2001 | Alperine et al. |
| 6,335,105 | B1 | 1/2002 | McKee |
| 6,387,456 | B1 | 5/2002 | Eaton, Jr. et al. |
| 6,387,526 | B1 | 5/2002 | Beele |
| 6,410,148 | B1 | 6/2002 | Eaton, Jr. et al. |
| 6,444,335 | B1 | 9/2002 | Wang et al. |
| 6,485,848 | B1 | 11/2002 | Wang et al. |
| 6,558,814 | B2 | 5/2003 | Spitsberg et al. |
| 6,562,409 | B2 | 5/2003 | Koshkarian et al. |
| 6,579,636 | B2 | 6/2003 | Oguri et al. |
| 6,607,852 | B2 | 8/2003 | Spitsberg et al. |
| 6,610,370 | B2 | 8/2003 | Wang et al. |
| 6,617,036 | B2 | 9/2003 | Eaton, Jr. et al. |
| 6,617,037 | B2 | 9/2003 | Sun et al. |
| 6,699,607 | B1 | 3/2004 | Spitsberg |
| 6,733,908 | B1 | 5/2004 | Lee et al. |
| 6,759,151 | B1 | 7/2004 | Lee |
| 6,777,093 | B1 | 8/2004 | Ojard et al. |
| 6,780,476 | B2 | 8/2004 | Horikawa |
| 6,787,195 | B2 | 9/2004 | Wang et al. |
| 6,820,334 | B2 | 11/2004 | Kebbede et al. |
| 6,844,075 | B1 | 1/2005 | Saak et al. |
| 2002/0136835 | A1 | 9/2002 | Li et al. |
| 2003/0003328 | A1 | 1/2003 | Spitsberg et al. |
| 2003/0035907 | A1 | 2/2003 | Campbell et al. |
| 2003/0113559 | A1 | 6/2003 | Eaton et al. |
| 2003/0224142 | A1 | 12/2003 | Lau et al. |
| 2004/0028941 | A1 | 2/2004 | Lane et al. |
| 2004/0043149 | A1 | 3/2004 | Gordon et al. |
| 2004/0062954 | A1 | 4/2004 | Wang et al. |
| 2004/0151840 | A1 | 8/2004 | Wang et al. |
| 2004/0234782 | A1 | 11/2004 | Sun |
| 2004/0234783 | A1 | 11/2004 | Eaton et al. |
| 2004/0234784 | A1* | 11/2004 | Eaton et al. ............... 428/446 |
| 2005/0074625 | A1 | 4/2005 | Meschter et al. |

OTHER PUBLICATIONS

U.S. Appl. No. 11/083,970, filed Mar. 21, 2005, Govern et al.
U.S. Appl. No. 11/150,097, filed Jun. 13, 2005, Hazel et al.
U.S. Appl. No. 11/150,099, filed Jun. 13, 2005, Spitsberg et al.
U.S. Appl. No. 11/150,100, filed Jun. 13, 2005, Spitsberg et al.

* cited by examiner

BOND COAT FOR SILICON-CONTAINING SUBSTRATE FOR EBC AND PROCESSES FOR PREPARING SAME

BACKGROUND OF THE INVENTION

This invention broadly relates to an article comprising: a silicon-containing substrate; an overlaying silicide-containing bond coat layer; and an overlaying environmental barrier coating (EBC). This invention further broadly relates to processes for forming the silicide-containing bond coat layer over the substrate, along with forming the EBC over the silicide-containing bond coat layer.

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through formulation of iron, nickel and cobalt-base superalloys. While superalloys have found wide use for gas turbine components used throughout gas turbine engines, and especially the higher temperature sections, alternative lighter weight substrate materials have been proposed and sought.

Ceramic materials containing silicon, such as those comprising silicon carbide (SiC) as a matrix material and/or as a reinforcing material (e.g., as fibers) are currently being used as substrate materials for higher temperature applications, such as gas turbine engines, heat exchangers, internal combustion engines, etc. These silicon-containing matrix/reinforcing materials are commonly referred to as ceramic matrix composites (CMCs). These silicon-containing materials used as matrix materials and/or as reinforcing materials can decrease the weight yet maintain the strength and durability for turbine components comprising such substrates, and are currently being considered for many gas turbine components used in higher temperature sections of gas turbine engines, such as turbine components comprising airfoils (e.g., compressors, turbines, vanes, etc.), combustors, and other turbine components for which reduced weight is desirable.

As operating temperatures increase, the high temperature durability of such CMC materials must also correspondingly increase. In many applications, a protective coating is beneficial or required for such silicon-containing substrates. Such coatings should provide environmental protection by inhibiting the major mechanism for degradation of silicon-containing materials in a corrosive water-containing environment, namely, the formation of volatile silicon monoxide (SiO) and silicon hydroxide ($Si(OH)_4$) products. Consequently, a necessary requirement of an environmental barrier coating (EBC) system for a silicon-containing substrate is stability in high temperature environments containing water vapors. Other important properties for these EBC systems can include a coefficient of thermal expansion (CTE) compatible with the silicon-containing substrate, low permeability for oxidants, low thermal conductivity, and chemical compatibility with the silicon-containing substrate and overlaying silica scale formed typically by oxidation.

Various single-layer and multilayer EBC systems have been investigated, but each has exhibited shortcomings relating to environmental protection and compatibility with a silicon-containing substrates. For example, EBC systems have been suggested for protecting silicon-containing CMC substrates from oxidation at high temperatures and degradation in the presence of aqueous environments (e.g., steam). These steam-resistant EBC systems include those comprising mullites ($3Al_2O_3.2SiO_2$) disclosed in, for example, commonly-assigned U.S. Pat. No. 6,129,954 (Spitsberg et al.), issued Oct. 10, 2000, and U.S. Pat. No. 5,869,146 (McCluskey et al.), issued Feb. 9, 1999. Other steam-resistant EBC systems comprising barium strontium aluminosilicate (BSAS), with or without mullite, and with or without additional thermal barrier coatings are disclosed in, for example, commonly-assigned U.S. Pat. No. 5,985,470 (Spitsberg et al.), issued Nov. 16, 1999; U.S. Pat. No. 6,444,335 (Wang et al.), issued Sep. 3, 2002; U.S. Pat. No. 6,607,852 (Spitsberg et al.), issued Aug. 19, 2003; and U.S. Pat. No. 6,410,148 (Eaton et al.), issued Jun. 25, 2002.

One version of these steam-resistant EBCs comprises an essentially three-layer system of: (1) a silicon bond coat layer adjacent the silicon-containing substrate; (2) a combination mullite-BSAS (e.g., 80% mullite-20% BSAS) transition layer overlaying and adjacent the bond coat layer; and (3) an outer barrier layer comprising BSAS. See, e.g., commonly assigned U.S. Pat. No. 6,410,148 (Eaton et al.), issued Jun. 25, 2002. The silicon bond coat layer provides good adhesion to the silicon-containing substrate (e.g., a SiC/SiC CMC substrate) and can also function as a sacrificial oxidation layer. The mullite-BSAS transition layer prevents rapid reaction between the outer barrier layer comprising BSAS and the underlying silica scale that typically forms on the silicon bond coat layer. The outer barrier layer comprising BSAS is relatively resistant to steam and other high temperature aqueous environments.

These steam-resistant three-layer EBC systems were originally developed for gas turbine component applications where the EBC surface temperature of the silicon-containing CMC substrate did not exceed about 2200° F. (1204° C.). Future gas turbine component applications are expected to increase the EBC surface temperature of the silicon-containing CMC substrate well above about 2200° F. (1204° C.).

Some thermal insulation from these expected higher surface temperatures can be addressed by including one or more thermal barrier coating (TBC) layers on top of the three-layer EBC system. See U.S. Pat. No. 6,444,335 (Wang et al.), issued Sep. 3, 2002 (T/EBC system that comprises a thermal insulating YSZ top coat layer overlying an intermediate layer containing YSZ and BSAS, mullite and/or alumina that overlies a mullite-containing layer that can be adhered to the silicon-containing substrate by an optional silicon layer.) Even with these additional TBC layers, the silicon-containing CMC substrate, as well as the silicon bond coat layer, is still expected to experience effective temperatures well above about 2200° F. (1204° C.).

Accordingly, it would be desirable to be able to provide a bond coat layer that can adhere the EBC system to the silicon-containing (e.g., CMC) substrate, even when experiencing effective interface temperatures between the EBC and the substrate that are well above about 2200° F. (1204° C.).

BRIEF DESCRIPTION OF THE INVENTION

An embodiment of this invention is broadly directed at an article comprising:
- a silicon-containing substrate;
- a silicide-containing bond coat layer overlying the substrate; and
- optionally an environmental barrier coating overlying the bond coat layer.

Another embodiment of this invention is broadly directed at an article comprising:
- a silicon-containing substrate;
- a silicide-containing bond coat layer overlying the substrate; and a steam-resistant environmental barrier coating overlying the bond coat layer, wherein the environmental barrier coating comprises: (1) an optional inner silica scale layer overlaying the bond coat layer; (2) an intermediate layer overlaying the inner silica scale layer, or bond coat layer in the absence of the inner silica scale layer, and comprising mullite, or a combination of mullite with a barium strontium aluminosilicate, a yttrium silicate, or a calcium aluminosilicate; and (3) an outer steam-resistant barrier layer overlaying the intermediate layer and consisting essentially of an alkaline earth silicate/aluminosilicate.

Another embodiment of this invention is broadly directed at a process comprising the following steps:
(a) providing a silicon-containing substrate;
(b) forming a silicide-containing bond coat layer over the substrate; and
(c) optionally forming an environmental barrier coating over the bond coat layer.

The embodiments of the articles and processes of this invention provide a number of advantages and benefits with regard to articles comprising silicon-containing substrates having environmental barrier coating (EBC) systems. The silicide-containing bond coat layer improves the adherence of the EBC system to the underlying silicon-containing substrate, even at operating temperatures in excess of about 2200° F. (1204° C.), and especially well in excess of about 2200° F. (1204° C.). The silicide-containing bond coat layer can also provide a source of silicon for forming an optional protective silica scale layer thereon. Because the silicide-containing bond coat layers comprise metal silicides that are typically much higher melting than prior silicon bond coat layers, the silicide-containing bond coat layer is resistant to adverse affects on its adherence and other mechanical properties, even when experiencing operating temperatures above about 2200° F. (1204° C.).

DETAILED DESCRIPTION OF THE INVENTION

Figure 1:
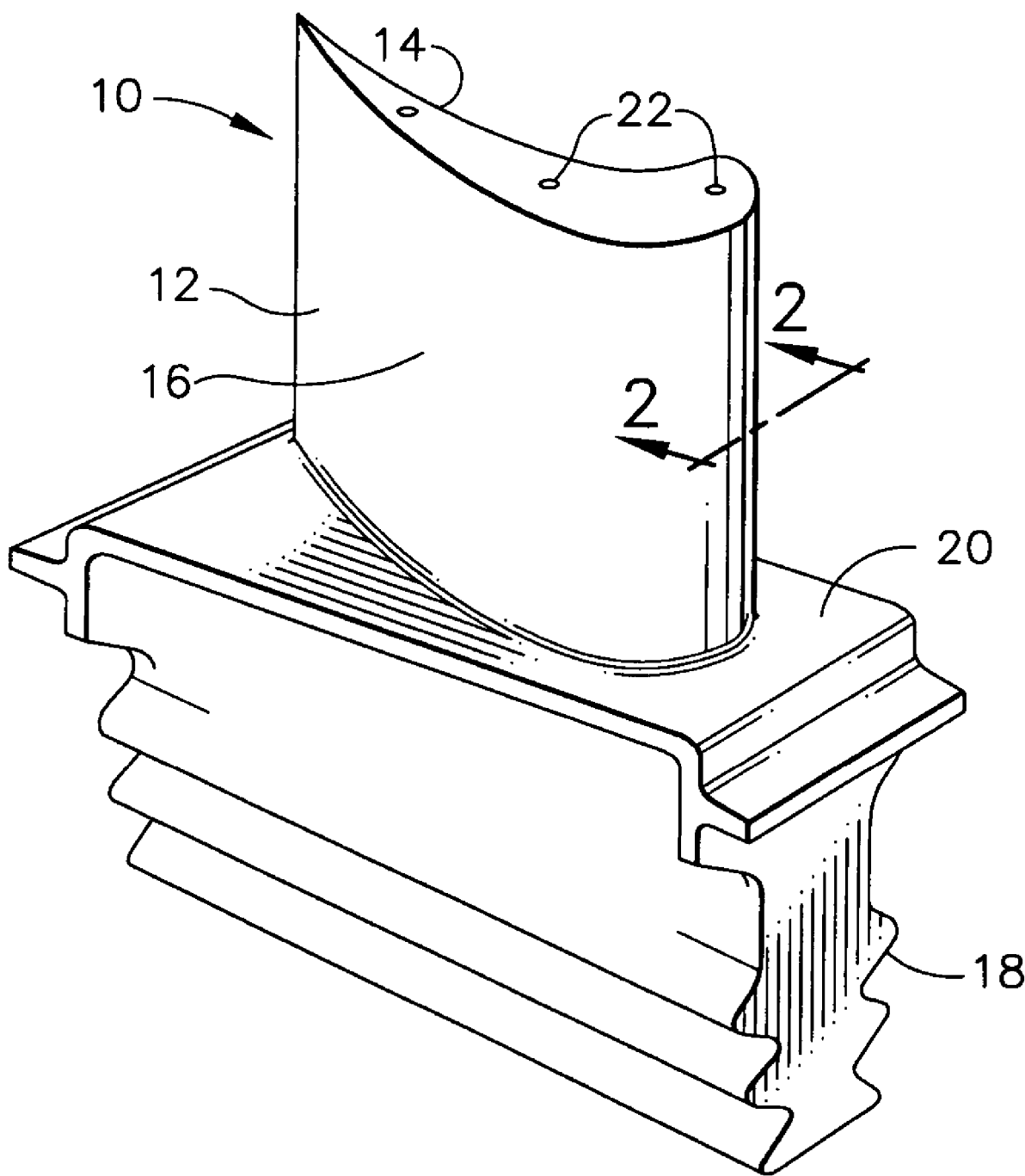
FIG. 1 is a perspective view of a turbine blade for which embodiments of this invention comprising the EBC system, silicide-containing bond coat layer and silicon-containing substrate are useful.

As used herein, the term "environmental barrier coating" (hereafter "EBC") refers to those coating systems which provide environmental protection, i.e., function as environmental barriers in protecting against environmental attack caused by, for example, high temperature, aqueous environments, such as steam, various corrodants, i.e., provide corrosion resistance, etc., and which are chemically compatible (e.g., relatively inert, etc.) with regard to an underlying silicide-containing bond coat layer.

As used herein, the term "steam-resistant environmental barrier coating" refers to EBCs that to those coating systems that can provide environmental protection for the underlying silicide-containing bond coat layer and silicon-containing substrate against environmental attack caused by high temperature, aqueous environments (e.g., steam). The steam-resistant EBCs typically comprise an outer steam-resistant barrier layer consisting essentially of an alkaline earth silicate/aluminosilicate, plus one or more optional layers.

As used herein, the term "steam-resistant barrier layer consisting essentially of an alkaline earth silicate/aluminosilicate" refers to a barrier layer that is resistant to environmental attack caused by high temperature, aqueous environments (e.g., steam) and which consists essentially of an alkaline earth silicate/aluminosilicate, e.g., comprises at least about 90% of an alkaline earth silicate/aluminosilicate, typically at least about 95% of an alkaline earth silicate/aluminosilicate, and more typically at least about 99% of an alkaline earth silicate/aluminosilicate.

As used herein, the term "alkaline earth aluminate/aluminosilicate" refers to alkaline earth aluminate (also referred to as "AEAs"), alkaline earth aluminosilicates (also referred to as "AEASs"), or combinations thereof. These alkaline earth silicate/aluminosilicates typically comprise alkaline earth aluminates, alkaline earth aluminosilicates or combinations thereof, wherein the alkaline earth is barium, strontium, or more typically a mixture thereof. The AEASs typically comprise barium strontium aluminosilicates (also referred to as "BSASs"). Usually, the BSASs comprise from about 0.00 to about 1.00 moles BaO, from about 0.00 to about 1.00 moles SrO, about 1.00 moles $Al_2O_3$ and about 2.00 moles $SiO_2$, wherein the combined moles of BaO and SrO is about 1.00 mole. Typically, the BSASs comprise from about 0.10 to about 0.90 moles (more typically from about 0.25 to about 0.75 moles) BaO, from about 0.10 to about 0.90 moles (more typically from about 0.25 to about 0.75 moles) SrO, about 1.00 moles $Al_2O_3$ and about 2.00 moles $SiO_2$, wherein the combined moles of BaO and SrO is about 1.00 moles. One such BSAS comprises about 0.75 moles BaO, about 0.25 moles SrO, about 1.00 moles $Al_2O_3$ and about 2.00 moles $SiO_2$. See commonly assigned U.S. Pat. No. 6,410,148 (Eaton et al.), issued Jun. 25, 2002, especially column 3, lines 6-25, the relevant portions of which are herein incorporated by reference.

As used herein, the term "corrosion resistant layer" refers to one or more layers that protect against environmental attack caused by sulfates and/or chlorides of calcium, magnesium, sodium, etc., or mixtures thereof (e.g., from sea salt), or by oxides of calcium, magnesium, etc., or mixtures thereof, such as a contaminant composition comprising mixed calcium-magnesium-aluminum-silicon-oxide systems (Ca—Mg—Al—SiO), that are commonly referred to as "CMAS." See, for example, commonly assigned U.S. Pat. No. 5,660,885 (Hasz et al.), issued Aug. 26, 1997, which describes these CMAS environmental contaminant compositions. Suitable corrosion resistant layers can comprise corrosion resistant metal silicates, alumina, etc.

As used herein, the term "corrosion resistant metal silicate protective layer" refers to a protective corrosion resistant layer(s) that comprises a sufficient amount or level of a corrosion resistant metal silicate to protect against environmental attack caused by sulfates and/or chlorides of calcium, magnesium, sodium, etc., or mixtures thereof (e.g., from sea salt), or by oxides of calcium, magnesium, etc., or mixtures thereof, such as a contaminant composition comprising mixed calcium-magnesium-aluminum-silicon-oxide systems (Ca—Mg—Al—SiO), such as CMAS. The corrosion resistant metal silicate protective layer can comprise at least about 50% of a corrosion resistant metal silicate, typically at least about 80% of a corrosion resistant metal silicate, and more typically 99% of a corrosion resistant metal silicate.

As used herein, the term "corrosion resistant metal silicate" refers to a metal silicate that is at least resistant to environmental attack caused by sulfates and/or chlorides of calcium, magnesium, sodium, etc., or mixtures thereof (e.g., from sea salt), or by oxides of calcium, magnesium, etc., or mixtures thereof (e.g., from CMAS). These metal silicates can also be resistant to environmental attack caused by other environmental contaminant compositions and corrosive agents, including high temperature, aqueous environments (e.g., steam), etc. Suitable corrosion resistant metal silicates for use herein can include yttrium silicates, scandium silicates, zirconium silicates, hafnium silicates, rare earth metal silicates such as lanthanum silicates, cerium silicates, praseodymium silicates, neodymium silicates, promethium silicates, samarium silicates, europium silicates, gadolinium silicates, terbium silicates, dysprosium silicates, holmium silicates, erbium silicates, thulium silicates, ytterbium silicates, lutetium silicates, etc., as well as various combinations of these metal silicates. The metal silicates can be in the form of a monosilicate, a disilicate, an orthosilicate, a metasilicate, a polysilicate, etc., or combinations thereof. Typically, the corrosion resistant metal silicate is a yttrium silicate, a scandium silicate, a lutetium silicate, a ytterbium silicate, a zirconium silicate, a hafnium silicate, or a combination thereof, and more typically a yttrium silicate, ytterbium silicate, or a lutetium silicate.

As used herein, the term "silicide-containing bond coat layer" refers to any bond coat layer that promotes, improves, etc., adhesion of the overlaying EBC system to the silicon-containing substrate, and which comprises silicon metal alloy (also referred to herein as a "metal silicide"). Typically, the silicide-containing bond coat layer comprises a metal silicide having a melting point of at least about 2800° F. (1537° C.), more typically at least about 3000° F. (1648° C.). These metal silicides can be monosilicides, disilicides, trisilicides, etc., and can be silicides of chromium, hafnium, molybdenum, niobium, tantalum, titanium, tungsten, zirconium, rare earths (lanthanum, cerium, praseodymium, neodymium, promethium, samarium, europium, gadolinium, terbium, dysprosium, holmium, erbium, thulium, ytterbium, lutetium, etc.), etc., or compatible combinations thereof. Suitable metal silicides for use herein include titanium trisilicide, titanium disilicide, chromium trisilicide, molybdenum trisilicide, molybdenum disilicide, niobium trisilicide, niobium disilicide, hafnium disilicide, tantalum trisilicide, tantalum disilicide, tungsten disilicide, zirconium disilicide, rare earth disilicides and trisilicides such as gadolinium disilicide, lanthanum disilicide, neodymium silicide, ytterbium trisilicide, etc., or compatible combinations thereof.

As used herein, the term "silicon-containing substrate" refers to any silicon-containing-substrate, including those comprising silicon-containing ceramic materials, metal silicides (if compositionally different from those comprising the silicide-containing bond coat layer), or combinations of such silicon-containing ceramic materials and silicon metal alloys. The silicon-containing substrate can comprise a substantially continuous matrix of silicon-containing materials, can be a composite comprising a continuous matrix of silicon-containing materials reinforced with discrete elements such as fibers, particles, etc. dispersed, embedded, etc., in the continuous matrix, etc. The discrete elements such as fibers, particles, etc., can be formed from silicon-containing ceramic materials, or can be formed from other materials, e.g., carbon fibers. Such combinations of dispersed, embedded, etc., fibers, particles, etc., in a continuous matrix of silicon-containing ceramics are typically referred to as ceramic matrix composites or CMCs. Typical CMCs comprise a continuous silicon-containing ceramic matrix that is fiber reinforced, usually with silicon-based fibers. These reinforcing fibers typically include a coating material that fully covers the fiber surfaces to impart and maintain structural integrity of the composite material systems. Typical fiber coating materials include boron nitride, silicon nitride, silicon carbide, carbon, etc. Suitable silicon-containing ceramic materials include silicon carbide, silicon nitride, silicon carbide nitride, silicon oxynitride, silicon aluminum oxynitride, etc., or combinations thereof. Suitable metal silicides useful as silicon-containing substrates include molybdenum suicides, niobium silicides, iron silicides, etc, or combinations thereof. Illustrative silicon-containing substrates suitable for use herein include silicon carbide coated silicon carbide fiber-reinforced silicon carbide particles and a silicon matrix, a carbon fiber-reinforced silicon carbide matrix, a silicon carbide fiber-reinforced silicon nitride matrix, etc.

As used herein, the term "thermal barrier coating" (hereafter "TBC") refers to those coatings that reduce heat flow to the EBC, bond coat layer, silicon-containing substrate, etc., of the article, i.e., form a thermal barrier, and which comprise ceramic materials have a melting point that is typically at least about 2600° F. (1426° C.), and more typically in the range of from about 3450° to about 4980° F. (from about 1900° to about 2750° C.). Suitable ceramic materials for thermal barrier coatings include, aluminum oxide (alumina), i.e., those compounds and compositions comprising $Al_2O_3$, including unhydrated and hydrated forms, various zirconias, in particular phase-stabilized zirconias (e.g., zirconia blended with various stabilizer metal oxides such as yttrium oxides), such as yttria-stabilized zirconias, ceria-stabilized zirconias, calcia-stabilized zirconias, scandia-stabilized zirconias, magnesia-stabilized zirconias, india-stabilized zirconias, ytterbia-stabilized zirconias, etc., as well as mixtures of such stabilized zirconias. See, for example, Kirk-Othmer's Encyclopedia of Chemical Technology, 3rd Ed., Vol. 24, pp. 882-883 (1984) for a description of suitable zirconias. Suitable yttria-stabilized zirconias can comprise from about 1 to about 20% yttria (based on the combined weight of yttria and zirconia), and more typically from about 3 to about 10% yttria. These phase-stabilized zirconias can further include one or more of a second metal (e.g., a lanthanide or actinide) oxide such as dysprosia, erbia, europia, gadolinia, neodymia, praseodymia, urania, and hafnia to further reduce thermal conductivity of the thermal barrier coating. See U.S. Pat. No. 6,025,078 (Rickerby et al.), issued Feb. 15, 2000 and U.S. Pat. No. 6,333,118 (Alperine et al.), issued Dec. 21, 2001, both of which are incorporated by reference. Suitable ceramic materials for thermal barrier coatings also include pyrochlores of general formula $A_2B_2O_7$ where A is a metal having a valence of 3+ or 2+ (e.g., gadolinium, aluminum, cerium, lanthanum or yttrium) and B is a metal having a valence of 4+ or 5+ (e.g., hafnium, titanium, cerium or zirconium) where the sum of the A and B valences is 7. Representative materials of this type include gadolinium-zirconate, lanthanum titanate, lanthanum zirconate, yttrium zirconate, lanthanum hafnate, cerium zirconate, aluminum cerate, cerium hafnate, aluminum hafnate and lanthanum cerate. See U.S. Pat. No. 6,117,560 (Maloney), issued Sep. 12, 2000; U.S. Pat. No. 6,177,200 (Maloney), issued Jan. 23, 2001; U.S. Pat. No. 6,284,323 (Maloney), issued Sep. 4, 2001; U.S. Pat. No. 6,319,614 (Beele), issued Nov. 20, 2001; and U.S. Pat. No. 6,387,526 (Beele), issued May 14, 2002, all of which are incorporated by reference.

As used herein, the term "CTE" refers to the coefficient of thermal expansion of a material, and is typically defined in units of $10^{-6}/°$ F. or $10^{-6}/°$ C.

As used herein, the term "comprising" means various compositions, compounds, components, coatings, substrates, layers, steps, etc., can be conjointly employed in this invention. Accordingly, the term "comprising" encompasses the more restrictive terms "consisting essentially of" and "consisting of."

All amounts, parts, ratios and percentages used herein are by weight unless otherwise specified.

Previously, bond coat layers for adhering EBC systems (including those comprising an outer steam-resistant barrier layer of BSAS and an intermediate transition layer of mullite-BSAS) to the underlying silicon-containing substrate have comprised silicon. Typically, this relatively thin silicon bond coat layer has a thickness of from about 3 to about 6 mils (from about 76 to about 152 microns). See, for example, commonly assigned U.S. Pat. No. 6,410,148 (Eaton et al.), Jun. 25, 2002.

Bond coat layers of EBCs for silicon-containing substrates used in higher temperature applications can experience effective temperatures above about 2200° F. (1204° C.), and especially well above about 2200° F. (1204° C.), e.g., upwards of about 2400° F. (1315° C.). The embodiments of the article and processes of this invention are based on the discovery that the adherence and other mechanical properties of silicon bond coat layers experiencing such higher temperatures can be adversely affected, even though silicon has a melting point of about 2570° F. (1410° C.). For example, such higher temperatures can adversely affect the ability of the silicon bond coat layer to adhere the EBC system to the underlying silicon-containing substrate, as well as cause other mechanical stresses in the EBC system.

The silicide-containing bond coat layers used in the embodiments of the article and processes of this invention solve these problems caused by the bond coat layer experiencing higher effective temperatures above about 2200° F. (1204° C.), and especially well above about 2200° F. (1204° C.), e.g., upwards of about 2400° F. (1315° C.). The metal silicides that these bond coat layers comprise are much higher melting than silicon, e.g., have melting points typically of at least about 2800° F. (1537° C.), more typically at least about 3000° F. (1648° C.). As a result, the silicide-containing bond coat layers of the embodiments of the article and processes of this invention are less susceptible to adverse effects on the mechanical properties (e.g., adherence and stress properties), especially compared to silicon bond coat layers.

While providing the ability to effectively handle higher temperatures, the silicide-containing bond coat layers used in the embodiments of the article and processes of this invention retain the other desirable physical and chemical properties of the replaced silicon bond coat layer. For example, the silicide-containing bond coat layer improves the adherence of the EBC system to the underlying silicon-containing substrate. In addition, the silicide-containing bond coat layer can provide a source of silicon for forming an optional protective silica scale layer thereon.

These silicide-containing bond coat layers are useful with a variety of articles for adhering overlaying EBC systems to silicon-containing substrates where the article is operated at, or exposed to, high temperature, corrosive environments, especially higher temperature, corrosive environments that occur during normal gas turbine engine operation. These articles can be in the form of turbine engine (e.g., gas turbine engine) parts and components, including those comprising turbine airfoils such as turbine blades, vanes and blisks, turbine shrouds, turbine nozzles, combustor components such as liners, deflectors and their respective dome assemblies, augmentor hardware of gas turbine engines, etc. The silicide-containing bond coat layers used in the embodiments of the articles of this invention are particularly useful for articles comprising silicon-containing substrates in the form of turbine blades and vanes, and especially the airfoil portions of such blades and vanes. However, while the following discussion of the embodiments of articles of this invention will be with reference to turbine blades and vanes, and especially the airfoil portions thereof, that comprise these blades and vanes, it should also be understood that these silicide-containing bond coat layers can be useful for adhering overlaying EBC systems in other articles comprising silicon-containing substrates.

The various embodiments of this invention are further illustrated by reference to the drawings as described hereafter. Referring to the drawings, FIG. 1 depicts a component article of a gas turbine engine such as a turbine blade or turbine vane, and in particular a turbine blade identified generally as 10. (Turbine vanes have a similar appearance with respect to the pertinent portions.) Blade 10 generally includes an airfoil 12 against which hot combustion gases are directed during operation of the gas turbine engine, and whose surfaces are therefore subjected to potential environmental attack by high temperature aqueous environments (e.g., steam), as well as other environmental contaminants such as sea salt or CMAS. Airfoil 12 has a "high-pressure side" indicated as 14 that is concavely shaped; and a suction side indicated as 16 that is convexly shaped and is sometimes known as the "low-pressure side" or "back side." In operation the hot combustion gas is directed against the high-pressure side 14. Blade 10 is anchored to a turbine disk (not shown) with a dovetail 18 formed on the root section 20 of blade 10. In some embodiments of blade 10, a number of internal passages extend through the interior of airfoil 12, ending in openings indicated as 22 in the surface of airfoil 12. During operation, a flow of cooling air is directed through the internal passages (not shown) to cool or reduce the temperature of airfoil 12.

Figure 2:
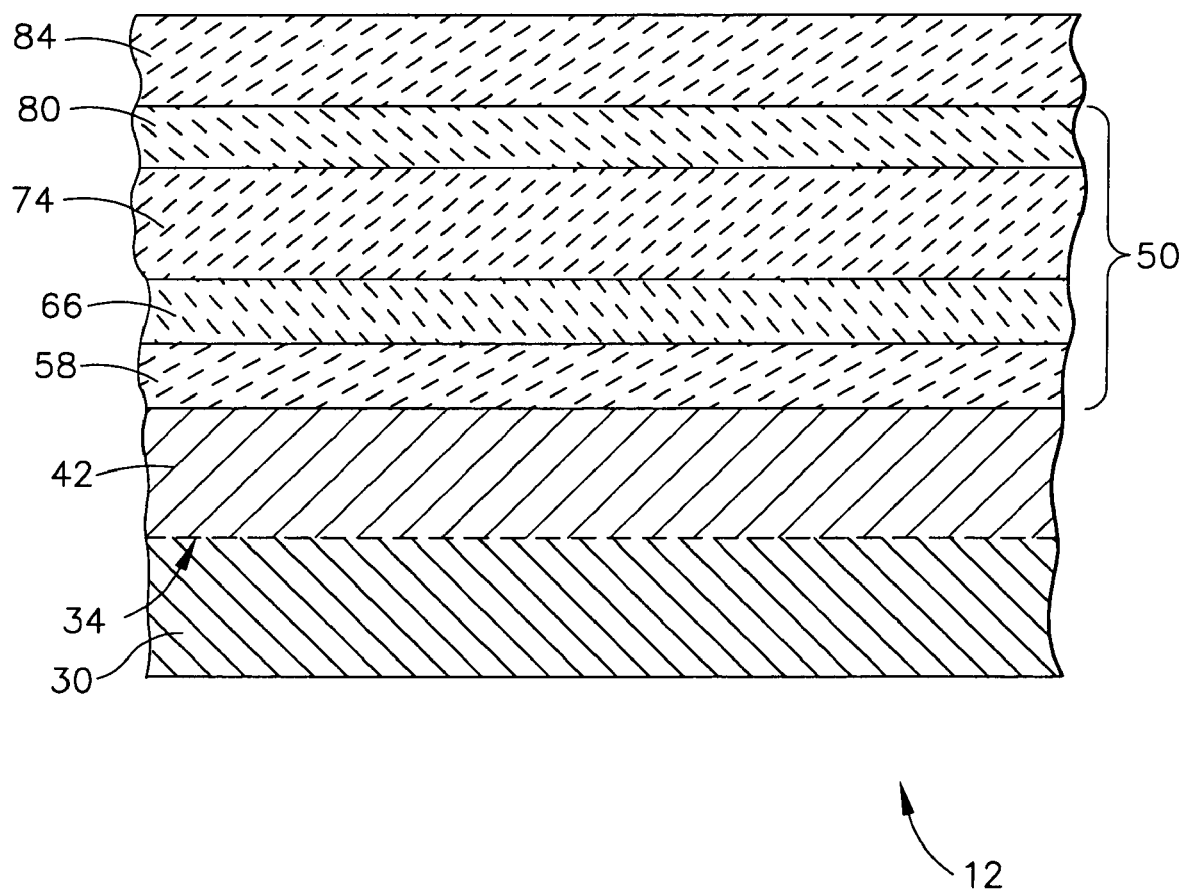
FIG. 2 is an enlarged sectional view through the airfoil portion of the turbine blade of FIG. 1, taken along line 2-2, showing an embodiment of the EBC system, silicide-containing bond coat layer and silicon-containing substrate of this invention, including an optional overlaying thermal barrier coating (TBC).

Referring to FIG. 2, the base material of airfoil 12 of blade 10 comprising the silicon-containing substrate is indicated generally as 30. Surface 34 of substrate 30 can be pretreated prior to forming the bond coat layer thereon to remove substrate fabrication contamination (e.g., cleaning surface 34) to improve adherence thereto, etc. For example, substrate 30 can be pretreated by subjecting surface 34 to a grit blasting step. This grit blasting step is typically carried out carefully in order to avoid damage to surface 34 of substrate 30 such as silicon carbide fiber reinforced CMC substrate. The particles used for the grit blasting should also be hard enough to remove the undesired contamination but not so hard as to cause significant erosive removal of substrate 30. The abrasive particles typically used in grit blasting are sufficiently small to prevent significant impact damage to surface 34 of substrate 30. When processing a substrate 30, for example, a silicon carbide CMC substrate, grit blasting is typically carried out with alumina particles, typically having a particle size of about 30 microns or less, and typically at a velocity of from about 150 to about 200 n/sec.

As shown in FIG. 2, adjacent to and overlaying surface 34 of substrate 30 is a silicide-containing bond coat layer indicated generally as 42. Bond coat layer 42 typically has a thickness of from about 0.5 to about 10 mils (from about 13 to about 254 microns), more typically from about 1 to about 6 mils (from about 25 to about 152 microns). This bond coat layer 42 can be applied to, deposited or otherwise formed on surface 34 by any process suitable for forming layers from metal silicides, including vapor phase deposition techniques, pack cementation techniques, high velocity oxy-fuel (HVOF) techniques, physical vapor deposition (PVD) techniques such as electron beam physical vapor deposition (EB-PVD), ion plasma, etc., thermal spray techniques such as plasma spray (e.g., air plasma spray), etc., chemical vapor deposition (CVD) techniques, etc., as described hereafter for forming thermal barrier coatings, or as well known to those skilled in the art.

As also shown in FIG. 2, adjacent to and overlaying bond coat layer 42 is an EBC indicated generally as 50, for example, a steam-resistant EBC. An embodiment of such an EBC 50 is disclosed in commonly assigned U.S. Pat. No. 6,410,148 (Eaton et al.), issued Jun. 25, 2002 (the relevant portions of which are herein incorporated by reference), especially at col. 3, line 6 through col. 4, line 17. As shown in FIG. 2, EBC 50 can optionally comprise a protective inner silica scale layer 58. For example, it can be useful to preoxidize a small portion or fraction of the silicide-containing bond coat layer 42 to form a protective inner silica scale layer 58. This preoxidized silica scale layer 58 can be formed, for example, by subjecting the silicide-containing bond coat layer 42 to a temperature of from about 800° to about 1300° C. for from about 15 minutes to about 100 hours.

As further shown in FIG. 2, EBC 50 can also comprise an optional intermediate layer indicated generally as 66 that is adjacent to and overlaying inner layer 58 and underlying outer barrier layer 74 (i.e., is between inner layer 58 and outer barrier layer 74), typically for the purpose or function of providing enhanced adhesion between outer barrier layer 74 and optional inner layer 58 or bond coat layer 42. This intermediate layer 66 typically has a thickness of from about 0.5 to about 10 mils (from about 13 to about 254 microns), more typically from about 0.5 to about 6 mils (from about 13 to about 152 microns). This optional intermediate layer 66 can comprise, for example, mullite, mullite-BSAS combinations, mullite-yttrium silicate combinations, mullite-calcium aluminosilicate combinations, etc., or combinations thereof. This optional intermediate layer 66 can consist essentially of mullite. However, because mullite tends to be cracked as the result of being applied by thermal spray techniques during formation of intermediate layer 66, intermediate layer 66 more typically comprises combinations of mullite with BSAS (mullite-BSAS), with yttrium silicate (mullite-yttrium silicate), with calcium aluminosilicate (mullite-calcium aluminosilicate), etc. For example, these combinations can comprise from about 40 to about 80% mullite, with from about 20 to about 60% BSAS, yttrium silicate, calcium aluminosilicate, etc. This optional intermediate layer 66 can be formed by the use of conventional coating methods such as physical vapor deposition (PVD) techniques (e.g., electron beam physical vapor deposition (EB-PVD), ion plasma, etc.), thermal spray techniques (e.g., plasma spray such as air plasma spray, etc.), chemical vapor deposition (CVD) techniques, etc., as described hereafter for forming thermal barrier coatings, or as well known to those skilled in the art.

As further shown in FIG. 2, EBC 50 further comprises an outer barrier layer indicated generally as 74 that is adjacent to and overlaying intermediate layer 66, typically for the purpose or function of providing protection against high temperature, aqueous environments (e.g., steam). This outer steam-resistant barrier layer 74 consists essentially of an alkaline earth aluminate/aluminosilicate (e.g., BSAS) and can have a thickness of at least about 0.5 mils (13 microns), and typically has a thickness of from about 1 to about 30 mils (from about 25 to about 762 microns), more typically from about 2 to about 10 mils (from about 51 to about 254 microns). This outer barrier layer 74 can be formed by the use of conventional coating methods such as physical vapor deposition (PVD) techniques (e.g., electron beam physical vapor deposition (EB-PVD), ion plasma, etc., thermal spray techniques (e.g., plasma spray, etc.), chemical vapor deposition (CVD) techniques, etc., as described hereafter for forming thermal barrier coatings, as well as diffusion surface sintering or reaction sintering/bonding, slurry-gel coating deposition techniques, etc., well known to those skilled in the art. See, for example, commonly assigned U.S. Pat. No. 5,759,032 (Sangeeta et al.), issued Jun. 2, 1998; U.S. Pat. No. 5,985,368 (Sangeeta et al.), issued Nov. 16, 1999; and U.S. Pat. No. 6,294,261 (Sangeeta et al.), issued Sep. 25, 2001 (the relevant portions of which are herein incorporated by reference) for suitable slurry-gel coating deposition techniques.

As further shown in FIG. 2, EBC 50 can further comprise corrosion resistant layer indicated as 80 that is adjacent to and overlaying outer barrier layer 74. Optional corrosion resistant layer 80 can comprise one or more layers comprising corrosion resistant materials such as corrosion resistant metal silicates. Corrosion resistant protective layers 80 typically have a thickness of from about 0.5 to about 10 mils (from about 13 to about 254 microns), more typically from about 1 to about 6 mils (from about 25 to about 152 microns). Corrosion resistant layers 80, such as corrosion resistant metal silicate layers, can be formed by the use of conventional coating methods such as physical vapor deposition (PVD) techniques (e.g., electron beam physical vapor deposition (EB-PVD), ion plasma, etc., thermal spray techniques (e.g., plasma spray such as air plasma spray), chemical vapor deposition (CVD) techniques, etc., as described hereafter for forming thermal barrier coatings, as well as by slurry dip techniques, oxide bonding techniques, pack cementation techniques, etc., well known to those skilled in the art.

As further shown in FIG. 2, EBC 50 can be provided with an optional overlaying thermal barrier coating (TBC) comprising one or more thermal insulating layers comprising thermal barrier coating material and indicated generally as 84. TBC 84 is shown in FIG. 2 as being adjacent to corrosion resistant layer 80 (or outer barrier layer 74 in the absence of corrosion resistant layer 80), but can be provided with additional transition layers therebetween (i.e., between TBC 84 and a corrosion resistant layer 80 or outer barrier layer 74) for CTE compatibility. See commonly assigned U.S. Pat. No. 6,444,335 (Wang et al.), issued Sep. 3, 2002 (the relevant portions of which incorporated by reference), for the use of such transition layers comprising BSAS, mullite and/or alumina with TBCs for CTE compatibility.

TBC 84 can have any suitable thickness that provides thermal insulating properties. TBCs 84 typically have a thickness of from about 1 to about 30 mils (from about 25 to about 769 microns), more typically from about 3 to about 20 mils (from about 75 to about 513 microns). TBC 84 (with or without transitional layers) can be formed on or over corrosion resistant layer 80 by a variety of conventional thermal barrier coating methods. For example, TBCs 84 can be formed by physical vapor deposition (PVD), such as electron beam PVD (EB-PVD), filtered arc deposition, or by sputtering. Suitable sputtering techniques for use herein include but are not limited to direct current diode sputtering, radio frequency sputtering, ion beam sputtering, reactive sputtering, magnetron sputtering and steered arc sputtering. PVD techniques can form TBCs 84 having strain resistant or tolerant microstructures such as vertical microcracked structures. EB-PVD techniques can form columnar structures that are highly strain resistant to further increase the coating adherence. See, for example, U.S. Pat. No. 5,645,893 (Rickerby et al.), issued Jul. 8, 1997 (especially col. 3, lines 36-63) and U.S. Pat. No. 5,716,720 (Murphy), issued Feb. 10, 1998 (especially col. 5, lines 24-61) (all of which are incorporated by reference), which disclose various apparatus and methods for applying TBCs by PVD techniques, including EB-PVD techniques.

An alternative technique for forming TBCs 84 is by thermal spray. As used herein, the term "thermal spray" refers to any method for spraying, applying or otherwise depositing TBC 84 that involves heating and typically at least partial or complete thermal melting of the ceramic material and depositing of the heated/melted ceramic material, typically by entrainment in a heated gas stream, on corrosion resistant layer 80 or outer barrier layer 74. Suitable thermal spray deposition techniques include plasma spray, such as air plasma spray (APS) and vacuum plasma spray (VPS), high velocity oxy-fuel (HVOF) spray, detonation spray, wire spray, etc., as well as combinations of these techniques. A particularly suitable thermal spray deposition technique for use herein is plasma spray. Suitable plasma spray techniques are well known to those skilled in the art. See, for example, Kirk-Othmer Encyclopedia of Chemical Technology, 3rd Ed., Vol. 15, page 255, and references noted therein, as well as U.S. Pat. No. 5,332,598 (Kawasaki et al.), issued Jul. 26, 1994; U.S. Pat. No. 5,047,612 (Savkar et al.) issued Sep. 10, 1991; and U.S. Pat. No. 4,741,286 (Itoh et al.), issued May 3, 1998 (herein incorporated by reference) which describe various aspects of plasma spraying suitable for use herein, including apparatus for carrying out plasma spraying.

While specific embodiments of the this invention have been described, it will be apparent to those skilled in the art that various modifications thereto can be made without departing from the spirit and scope of this invention as defined in the appended claims.

What is claimed is:

1. A gas turbine engine component exposed to a high temperature, corrosive environment comprising:
    a silicon-containing substrate; and
    a bond coat layer overlying the substrate, wherein the bond coat layer consists of
    a metal silicide selected from the group consisting of titanium trisilicide, chromium trisilicide, hafnium disilicide, gadolinium disilicide, lanthanum disilicide, neodymium silicide, ytterbium trisilicide, rare earth disilicides and trisilicides, or a compatible combination thereof.

2. The component of claim 1 wherein the metal silicide has a melting point of at least about 2800° F.

3. The component of claim 2 wherein the metal silicide has a melting point of at least about 3000° F.

4. The component of claim 1 wherein the bond coat layer is adjacent to the substrate and has a thickness of from about 0.5 to about 10 mils.

5. The component of claim 4 wherein the bond coat layer has a thickness of from about 1 to about 6 mils.

6. The component of claim 1 wherein the substrate comprises a silicon-containing ceramic material, a silicon metal alloy, or a combination thereof.

7. The component of claim 6 wherein the substrate comprises a continuous matrix of a silicon-containing material reinforced with fibers.

8. The component of claim 6 wherein the substrate comprises a silicon carbide coated silicon carbide fiber-reinforced silicon carbide particles and a silicon matrix, a carbon fiber-reinforced silicon carbide matrix, or a silicon carbide fiber-reinforced silicon nitride matrix.

9. The component of claim 6 wherein the substrate comprises a silicon-containing ceramic material.

10. The component of claim 9 wherein the silicon-containing ceramic material comprises silicon carbide, silicon nitride, silicon carbide nitride, silicon oxynitride, silicon aluminum oxynitride, or a combination thereof.

11. The component of claim 1 which further comprises an environmental barrier coating adjacent to and overlying the bond coat layer.

12. The component of claim 11 which further comprises a thermal barrier coating overlaying the environmental barrier coating.

13. The component of claim further comprising:
    a steam-resistant environmental barrier coating overlaying the bond coat layer, wherein the environmental barrier coating comprises: (1) an optional inner silica scale layer overlaying the bond coat layer; (2) an intermediate layer overlaying the inner layer, or the bond coat layer in the absence of the inner layer, and comprising mullite, or a combination of mullite with a barium strontium aluminosilicate, a yttrium silicate, or a calcium aluminosilicate; and (3) an outer steam-resistant barrier layer overlaying the intermediate layer and consisting essentially of an alkaline earth silicate/aluminosilicate.

14. The component of claim 13 wherein the environmental barrier coating comprises an inner silica scale layer adjacent to the bond coat layer wherein the inner silica scale layer has a thickness of from about 1 to about 6 mils.

15. The component of claim 14 wherein the intermediate layer comprises a combination of mullite with a barium strontium aluminosilicate, a yttrium silicate, or a calcium aluminosilicate.

16. The component of claim 15 wherein the intermediate layer has a thickness of from about 0.5 to about 6 mils and comprises from about 40 to about 80% by weight mullite, and from about 20 to about 60% by weight barium strontium aluminosilicate.

17. The component of claim 13 wherein the outer barrier layer consists essentially of barium strontium aluminosilicate.

18. The component of claim 13 wherein the environmental barrier coating further comprises a corrosion resistant layer overlaying the outer barrier layer, and wherein corrosion resistant layer comprises a corrosion resistant metal silicate.

19. The component of claim 18 which further comprises a thermal barrier coating overlaying the corrosion resistant layer.

20. The component of claim further comprising:
    an environmental barrier coating adjacent to and overlying the bond coat layer,
    wherein the environmental barrier coating comprises an outer steam-resistant barrier layer consisting essentially of an alkaline earth silicate/aluminosilicate.

21. The component of claim 20 wherein the outer barrier layer consists essentially of a barium strontium aluminosilicate.

22. The component of claim 21 wherein the environmental barrier coating further comprises a corrosion resistant layer overlaying the outer barrier layer.

23. The component of claim 22 wherein the corrosion resistant layer comprises a corrosion resistant metal silicate.

24. A gas turbine engine component exposed to a high temperature, corrosive environment comprising:
    a silicon-containing substrate; and
    a bond coat layer overlying the substrate, wherein the bond coat layer consists of
    a metal silicide selected from the group consisting of titanium trisilicide, chromium trisilicide, neodymium silicide, ytterbium trisilicide, rare earth trisilicides, or a compatible combination thereof.

* * * * *